C. J. CLARK.
APPARATUS FOR MEASURING THE FLOW OF FLUIDS.
APPLICATION FILED JULY 1, 1908.
Patented Feb. 8, 1910.
2 SHEETS—SHEET 1.
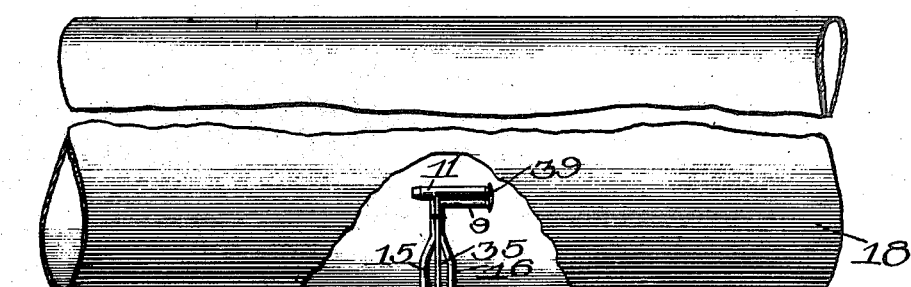
Fig. 1.
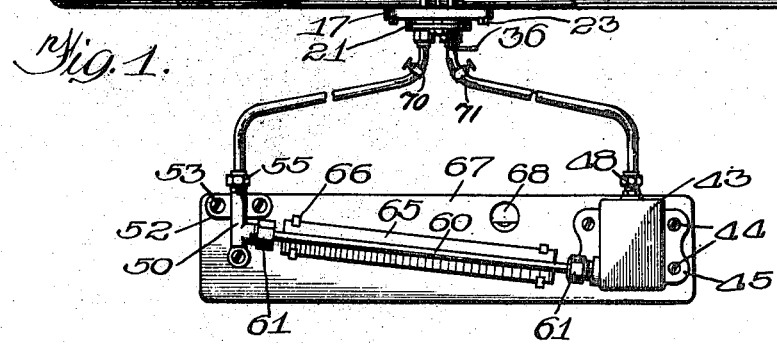
Fig. 2.      Fig. 3.
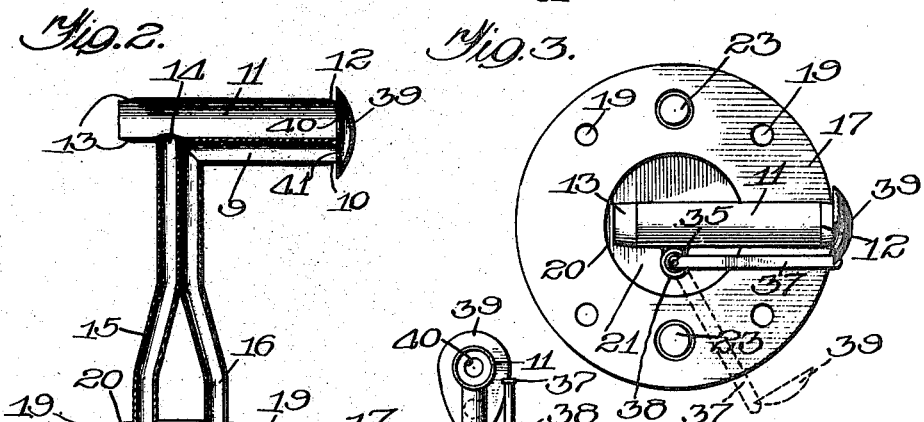
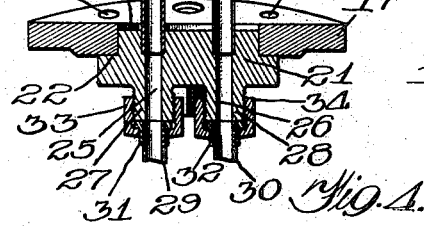
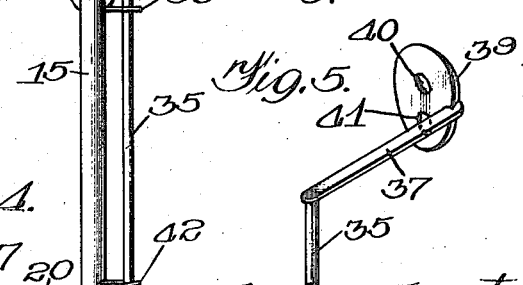
Fig. 4.      Fig. 5.
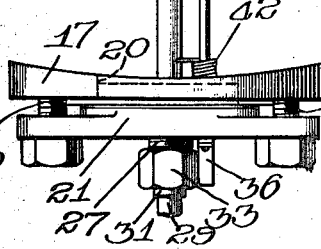
Witnesses:
Inventor:
Charles J. Clark, C. J. CLARK.
APPARATUS FOR MEASURING THE FLOW OF FLUIDS.
APPLICATION FILED JULY 1, 1908.
948,872.
Patented Feb. 8, 1910.
2 SHEETS—SHEET 2.
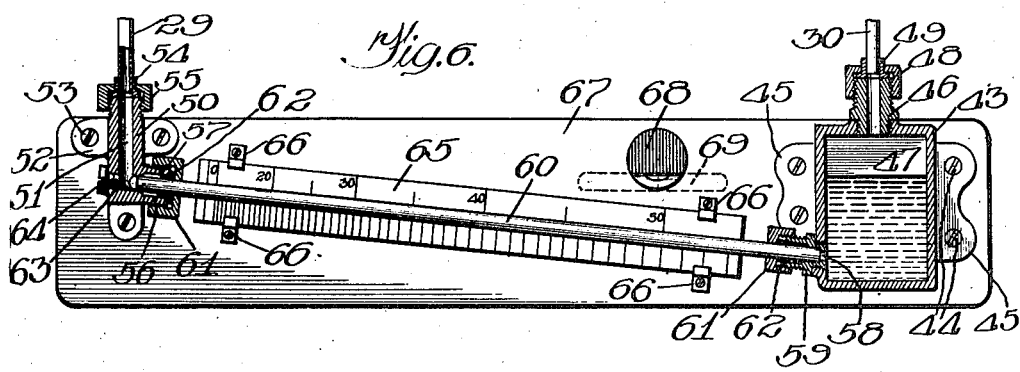
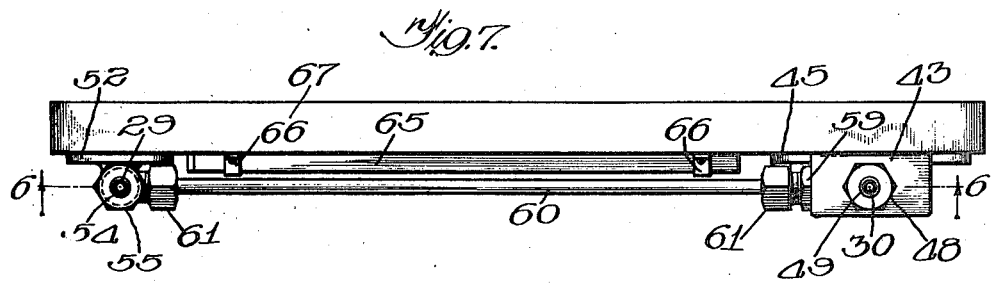
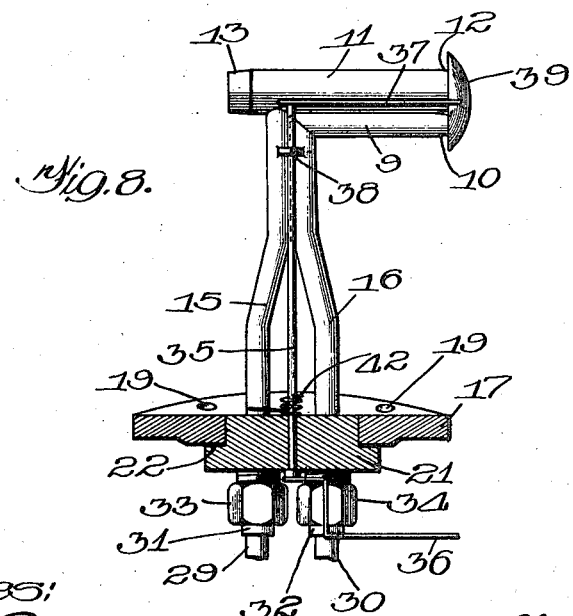

UNITED STATES PATENT OFFICE.

CHARLES J. CLARK, OF BLUE ISLAND, ILLINOIS.

APPARATUS FOR MEASURING THE FLOW OF FLUIDS.

948,872.

Specification of Letters Patent.

Patented Feb. 8, 1910.

Application filed July 1, 1908. Serial No. 441,503.

*To all whom it may concern:*

Be it known that I, CHARLES J. CLARK, a citizen of the United States of America, and resident of Blue Island, Cook county, Illinois, have invented a certain new and useful Improvement in Apparatus for Measuring the Flow of Fluids, of which the following is a specification.

My invention relates to improvements in apparatus for measuring the flow of fluid, and has for its object the production of a device by the use of which the rate of flow of fluids, either confined or unconfined, may be measured.

A further object is the production of a device in which the Pitot tube is used in combination with other mechanism, thereby obtaining an accurate and reliable device and one that is least liable to get out of order.

A further object is the production of a device that can be thrown out of service when readings are not desired, together with means for minimizing the accumulation of foreign matter within the tubes.

A further object is the production of a device that can be readily placed in a pipe, and as readily removed when desired.

These and such other objects as may hereinafter be disclosed are attained by my device, embodiments of which are illustrated in the accompanying drawings, in which—

Figure 1 is a plan view of my device in position. Fig. 2 is a sectional view through a portion of my device. Fig. 3 is a top plan view of Fig. 2. Fig. 4 is an end view of Fig. 3. Fig. 5 represents a perspective view of the end cap or guard. Fig. 6 represents a side elevation of the indicating portion of my device, partly in section. Fig. 7 represents a top plan view of Fig. 6. Fig. 8 represents a side elevation of Fig. 4, partly in section.

Like numerals of reference indicate like parts in the several figures of the drawings.

Referring now to the drawings—9 represents a Pitot tube preferably terminating at its forward end or opening in a sharpened edge 10; 11 represents the static tube or side gage also terminating in sharpened or thin edges 12, 13; 14 represents the actual static orifice from which extends a tube 15. This tube and the lower limb 16 of the Pitot tube communicate with the two sides of the indicator. The supporting plate or flange 17 is adapted to be secured to a pipe 18 by means of bolts or rivets passing through the holes 19—19, or in any well-known manner. The opening 20 in this plate is adapted to register with the corresponding opening in the tube or pipe 18, and a plug 21 is fitted within the opening 20 and provided with a shoulder 22 adapted to rest against the outer face of the plate. This plug may be screw-threaded if desired. The plug 21 is removably secured to the plate in any desired manner, as, for instance, by bolts 23.

In Fig. 1, the device is shown with the tubes inserted in place within the pipe 18. The tubes 15—16 extend into the plug 21 communicating with passages 25—26 which extend through screw-threaded nipples. Tubes 29—30 communicate with said passage and are secured to said plug by means of screw-connections 31—32, and nuts 33—34, insuring an air-tight connection. A shaft 35 passes through the plug and extends upwardly alongside the tubes 15—16 and provided with a hand lever 36 rigidly secured thereto. The arm 37 is rigidly mounted on the top of the shaft and extending alongside the tubes 9—11. The shaft is mounted on bearings 38 which are shown secured to the tubes, and serve to hold the shaft in place. On the end of the arm 37 is secured a cap or guard 39 provided with openings 40—41 adapted to register with the mouths of the tubes 9—11 when in place on the front thereof. A spring 42 serves to hold the shaft in position, so that the cap is normally in front of the opening. By moving the hand lever 36, the cap can be thrown aside, as shown in Fig. 3.

Referring now to Fig. 6, the indicating means comprises a casing or reservoir 43 adapted to be secured to the wall by means of screws passing through ears or wings 45. A hollow plug 46 communicates with the interior 47 of the casing, and the tube 30 is secured thereto in open communication therewith by means of a nut 48 and screw connection 49. A chambered casting 50 having a passage 51 is also provided with ears 52 through which the screw 53 passes, fastening the casting in position. The tube or pipe 29 communicates with the passage 51 and is held in place by screw connections and nuts 54—55. The casting 50 is provided with a threaded nipple 56 in which is a passage 57 communicating with the passage 51. A reservoir 43 is provided with an opening 58 in which is screwed the plug 59. A glass tube 60 communicates with the passage 51 and the chamber 47, and by means of nuts 61 and screw connections 62 the connections between the said tube and castings are rendered right. In the casting 50, an opening 63 is made in line with the passage 57 and a screw 64 adapted to close the opening. This passage is so positioned that the tube 60 may be withdrawn or inserted therethrough without removing the castings 50 or 43 from their fixed position. Back of the tube 60 is placed a scale 65 fitting within clamps 66 and so arranged that the scale may be slid longitudinally of the tube 60. This permits the longitudinal movement of the scale in order to adjust it to varying conditions to which the device may be subjected. The indicating mechanism as a whole is preferably secured to a frame 67 and provided with an opening 68, back of which is secured a spirit level 69, thus insuring the proper placing of the device. The chamber 47 is partially filled with some liquid—such, for instance, as kerosene oil—to a height on a level with the zero of the scale when the instrument is out of service. At some point within the tubes 29—30 are located valves 70—71 by means of which the indicating mechanism may be cut off. The valves are also so constructed as to permit communication with the air in order to blow out any obstruction through the tube if desired. The scale shown in Fig. 6 has been ruled off to indicate velocity in feet per second in a tube of a certain size—for instance, the tube shown in 18. The indicating mechanism above shown may be some other form of manometer or liquid level differential gage. The great advantage, however, in having one limb inclined toward the horizontal is that it renders it easier to read small differences of pressure set up in the device.

The scale shown is divided as a scale of squares, as clearly shown in the drawing. In further explanation of this, I might say that since pressure registered by a differential manometer when connected to a Pitot tube and static tube varies as the second power of the velocity of the fluid being measured, the scale 65, in order to read velocities or volumes directly, is graduated as shown in the drawing, according to the formula $x=ay^2$, in which $x$ equals the distance on the scale from zero to division $y$; $y$ equals any division number on the scale, and $a$ a constant, depending on the size and construction of the instrument.

In the operation of my device, when it is desired to take a reading, the guard is thrown out of position, exposing the entrances to the tubes 9—11 to the stream of gas. The pressure set up in these tubes is transmitted through connections 29—30 to the indicating instrument, whereupon the level of the liquid moves to a position corresponding to the rate of flow which can be read off on the scale 65. On releasing the lever, the guard returns to its normal position, protecting the entrances to the tubes, and by forming a passage between these tubes, through the openings 40—41 and the chamber within the guard, equalizes the pressure and allows the liquid to return to zero.

In the description given above, the term "Pitot" tube is understood to mean a tube opening into and facing the current whose rate of flow is to be measured, with the plane of the orifice approximately normal to the line of flow for the purpose of receiving and transmitting the sum of the static pressure plus the pressure due to the velocity or velocity head. By the term "static opening" or orifice, I mean an opening into the current of fluid of such form and so placed as to receive and transmit a pressure not appreciably greater than the actual static pressure of the fluid.

While I have shown the static tube and the Pitot tube side by side and the shaft carrying the guard secured thereto, it is evident that it is not necessary to have these parts so located in order to fully carry out my device. I find, however, that this arrangement is the most advantageous one in order to simplify the device as a whole. The static opening or orifice could, of course, be placed in any other position and the tube itself is not a necessity, the idea simply being to provide means whereby the stream of fluid is compelled to flow parallel to the plane of the orifice. This is rendered necessary from the fact that the flow of fluids in the tubes is not always in parallel lines, there being always more or less vortex motion, and the presence of this vortex motion causes the previous forms of static openings to indicate incorrectly, thus making the reading of the apparatus incorrect by an unknown amount, and of which amount the usual method of calibrating the instruments by passing them at a known speed through a fluid at rest gives no indication.

In the use of ordinary devices of this character, heretofore in use, impurities within the gas or fluid to be measured soon clog up the openings and tubes and this renders the device, if not inoperative, soon inaccurate. By the use of my device, however, the tubes are only open to the flow of gas or fluid when readings are being taken. Consequently there is but little chance for foreign matter to accumulate within the tubes. Of course, a certain amount will accumulate if the tubes are open at all, but this can be readily removed either by opening the valves 70—71 and increasing the pressure, blowing out all impurities from the tube; or in the event that the impurities are of an oily nature or such as adhere closely to the insides of the tubes, the tubes themselves may be removed from the pipe by simply unscrewing the screws 23—23 and the tubes cleaned in any well-known manner.

The indicating mechanism may be adjusted vertically or horizontally, thus varying the inclination of the tube from the horizontal and rendering the device capable of use under all circumstances.

It is evident that there may be many modifications in this device which are not described in this application, but which come fully within the spirit of the invention which comprises the use of the guard, the indicating means and the Pitot tube and side gage.

In order that there may be no misunderstanding in the use of the terms, I define a Pitot tube to be a tube provided with an orifice facing the current of fluid being measured, the plane of said orifice being substantially normal to the line of flow. And I also define the term "static tube or side gage" to mean a tube provided with an orifice opening into the current of fluid, the plane of said orifice being substantially parallel to the line of flow.

In the above specification, it will be noted that applicant has refrained from entering into a discussion of the use of the Pitot tube, as well as the methods of measuring the flow of liquid, but has confined himself strictly to the mechanical features of the device in question.

I claim:

1. In a device of the class described, the combination with a Pitot tube, a side gage, indicating means, and means including a movable chambered cap for preventing the obstruction of said tubes, and means for holding said cap and moving it.

2. In a device of the class described, the combination with a Pitot tube, a side gage, indicating means, means connecting the indicating means with the tubes and a movable chambered cap adapted to cover the entrances to said Pitot tube and side gage, and means for holding said cap and moving it.

3. In a device of the class described, the combination with a Pitot tube, a side gage, indicating means, means connecting the indicating means with the tubes and a movable chambered cap adapted to cover the entrances to said Pitot tube and side gage.

4. In a device of the class described, the combination with a Pitot tube, a side gage, indicating means, means connecting the indicating means with the tubes and a movable chambered cap adapted to cover the entrance to said Pitot tube and side gage, thus permitting intercommunication between said tubes.

5. In a device of the class described, the combination with a Pitot tube, a side gage, indicating means, means connecting the indicating means with the tubes and spring actuated chambered means for preventing the obstruction of said Pitot tube and side gage.

6. In a device of the class described, the combination with a Pitot tube, a side gage, indicating means, means connecting the indicating means with the tubes and a spring-actuated movable chambered cap adapted to cover the entrances to said tubes.

7. In a device of the class described, the combination with a Pitot tube, a side gage, indicating means, means connecting the indicating means with the tubes and a spring-actuated movable chambered cap adapted to cover the entrance to said tubes, thus permitting intercommunication between said tubes.

8. In a device of the class described, the combination with a Pitot tube, a side gage, indicating means, and spring actuated chambered means for preventing the obstruction of said tubes, so adjusted as to normally cover the entrances to said tubes.

9. In a device of the class described, the combination with a Pitot tube, a side gage, indicating means, means for preventing the obstruction of said tubes, and means including a chambered cap for equalizing the pressure and means connecting the indicating means with the tubes.

10. In a device of the class described, a Pitot tube, a static tube having a static opening, a movable chambered cap arranged to cover said Pitot tube and static tube, and a manometer communicating with said tubes and having one limb inclined toward the horizontal.

11. In a device of the class described, a Pitot tube, a static tube having a static opening, and a movable cap arranged to cover said Pitot tube and static tube, said cap being provided with a passage whereby the pressure in said Pitot tube and static tube may be equalized, in combination with a manometer communicating therewith and having one limb horizontally inclined.

12. In a device of the class described, the combination with a Pitot tube, a static tube having substantially parallel sides, open at both ends and provided with an orifice in the wall of said tube, and indicating means, whereby the flow of fluid is shown, together with means connecting the Pitot tube and static tube with the indicating means.

13. In a device of the class described, the combination with a Pitot tube, a static tube, a movable cap adapted to cover said Pitot tube and static tube and to form a closed passage therebetween, means for holding said cap and moving it, indicating means whereby the flow of liquid is shown, and means connecting the Pitot tube and static tube with the indicating means.

14. In a device of the class described, the combination with a Pitot tube, a static tube having substantially parallel sides, and a manometer communicating with said tubes and having one limb inclined toward the horizontal, and a scale graduated as a scale of squares.

15. In a device of the class described, the combination with a Pitot tube, a static tube having substantially parallel sides, open at both ends, and provided with an orifice in the wall thereof, a movable cap adapted to cover and form a closed passage between said Pitot tube and static tube, means for holding said cap and moving it, indicating means whereby the flow of fluid is shown, and means connecting the Pitot tube and static tube with the indicating means.

16. In a device of the class described, the combination with a Pitot tube, a static tube, a movable cap adapted to cover and form a closed passage between said Pitot tube and static tube, means for holding said cap and moving it, and a manometer communicating with said tubes and having one limb inclined toward the horizontal, and a graduated scale.

17. In a device of the class described, the combination with a Pitot tube, a static tube open at both ends and provided with an orifice in the wall thereof, a movable cap adapted to cover and form a closed passage between said Pitot tube and static tube, means for holding said cap and moving it, and a manometer communicating with said tubes and having one limb inclined toward the horizontal.

18. In a device of the class described, the combination with a Pitot tube, a static tube having substantially parallel sides, open at both ends and provided with an orifice in the wall thereof, and a manometer communicating with said tubes and having one limb inclined toward the horizontal at an angle exceeding sixty degrees from the vertical.

Signed by me at Chicago, Illinois, this 25th day of June, 1908.

CHARLES J. CLARK.

Witnesses:
 ALBERT J. SAUSER,
 S. LEWIS.